R. A. WILDER.
Car Wheel.
No. 10,714.  Patented Mar. 28, 1854
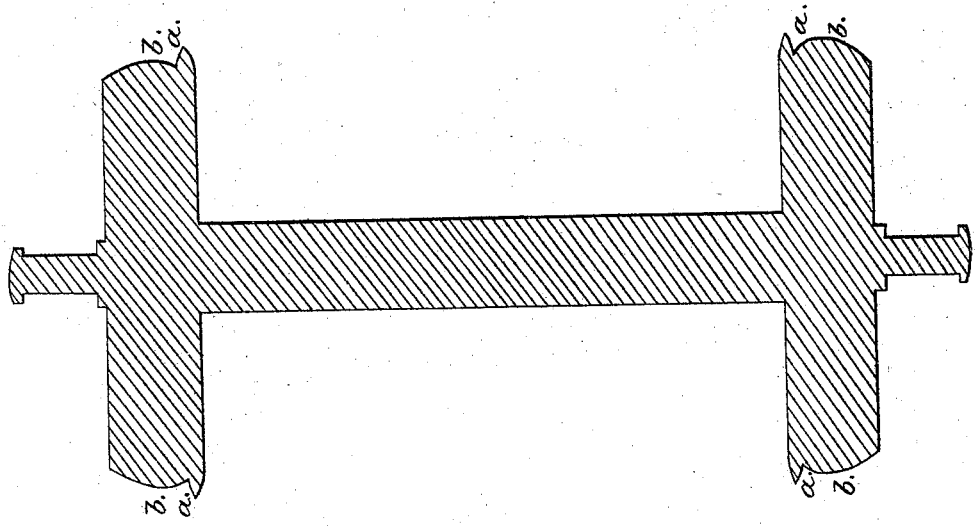
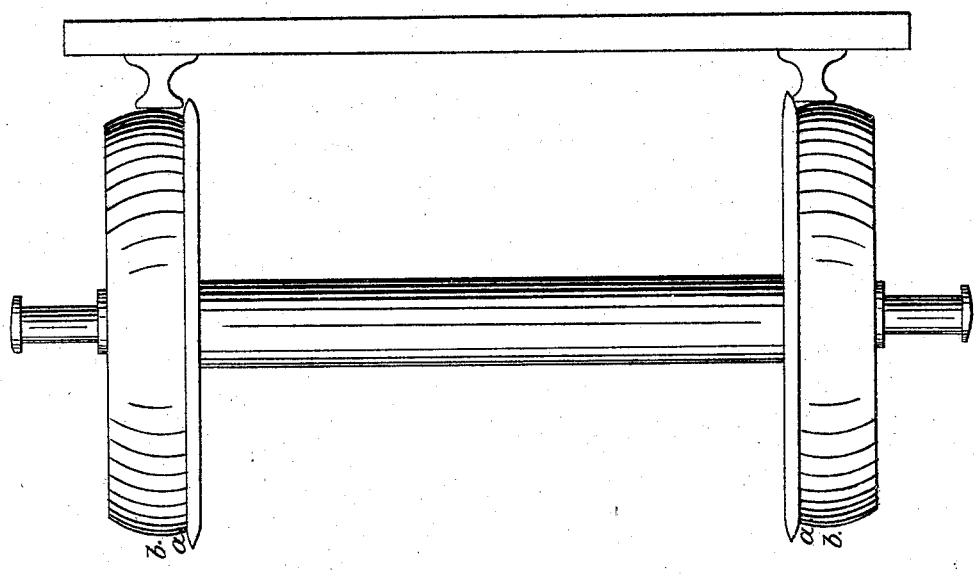

UNITED STATES PATENT OFFICE.

R. A. WILDER, OF SCHUYLKILL HAVEN, PENNSYLVANIA.

RAILROAD-CAR WHEEL.

Specification of Letters Patent No. 10,714, dated March 28, 1854.

*To all whom it may concern:*

Be it known that I, R. A. WILDER, of Schuylkill Haven, Pennsylvania, have invented a new and useful Improvement in Treads of Railroad-Car Wheels, of which the following is a full description, reference being had to the annexed drawings.

My improvement consists in giving a new form to the tread of the wheel for the purpose of bringing the bearing directly upon the top of the rail and of removing the pressure from the flange which from the present conical form has a constant tendency to "wind up" upon the track. The mode by which I accomplish these purposes, is to form a groove next the flange and with the rim of the wheel and to give the tread of the wheel a convex form as seen in the drawing. The form of the wheel is seen readily from the section in which $a$ represents the groove and $b$ the convexity. In every lateral motion of the cars and especially in turning curves the tendency of the conically formed tread of wheels mostly in use is to run up upon the rails crushing their inner edges. This evil my new form of tread obviates, and saves both wheels and rails from abrasion.

What I claim and desire to secure by Letters Patent is—

The groove in the wheel near the flange and in combination therewith the convex form of the tread.

R. A. WILDER. [L. S.]

Witnesses:
E. F. WESTON,
S. R. DICKSON.